United States Patent
Sevat et al.

(10) Patent No.: US 7,274,390 B2
(45) Date of Patent: Sep. 25, 2007

(54) DEVICE FOR PARALLEL DATA PROCESSING, AND CAMERA SYSTEM COMPRISING SUCH A DEVICE

(75) Inventors: Leonardus Hendricus Maria Sevat, Eindhoven (NL); Cornelis Niessen, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 783 days.

(21) Appl. No.: 10/143,646

(22) Filed: May 10, 2002

(65) Prior Publication Data

US 2002/0186311 A1 Dec. 12, 2002

(30) Foreign Application Priority Data

May 11, 2001 (EP) ................. 01201737

(51) Int. Cl.
*H04N 5/228* (2006.01)
*G06F 15/00* (2006.01)

(52) U.S. Cl. .............................. 348/222.1; 712/10
(58) Field of Classification Search .............. None
See application file for complete search history.

(56) References Cited

U.S. PATENT DOCUMENTS 4,873,515 A * 10/1989 Dickson et al. ............ 345/614
5,627,603 A * 5/1997 Sakai ........................ 348/222.1
6,173,386 B1 * 1/2001 Key et al. .................... 712/10
6,421,084 B1 * 7/2002 Chang et al. ............... 348/273
6,735,684 B1 * 5/2004 Shigematsu et al. .......... 712/10
6,859,869 B1 * 2/2005 Vorbach ...................... 712/10

OTHER PUBLICATIONS

"Doubly Twisted Torus Networks for VLSI Processor Arrays", by Carlo H. Sequin, Proceedings of the Annual Symposium on Computer Architecture, vol. 8, May 1, 1981, pp. 471-480.

* cited by examiner

*Primary Examiner*—David Ometz
*Assistant Examiner*—Luong T. Nguyen

(57) ABSTRACT

The invention relates to a device for parallel processing data and to a camera system comprising such a device. The camera system (1) comprises a sensor matrix (2), a data converter (3), a DSP (4), a central controller (5), a data buffer (7) and a processor matrix (11) consisting of processors (12). The sensor matrix (2) converts incident electromagnetic radiation into pixel signals. The data converter (3) converts the pixel signals into data. The arrows (6) and (8) diagrammatically indicate the transport of pixel signals and data. The data buffer (7) is physically divided into a part (7A) and a part (7B) and functionally divided into an I/O register (9) and a memory bank (10). The central controller (5) co-ordinates the different tasks. The processors (12) and the data buffer (7) have data ports (13) and further data ports (14) with inputs and outputs which are mutually connected in an electrically conducting manner using the connections (15). The processors (12) are arranged in rows (16) which are mutually staggered, and columns (17). This makes all connections (15) substantially straight. Due to the amount of connections, this reduces the surface area.

4 Claims, 5 Drawing Sheets

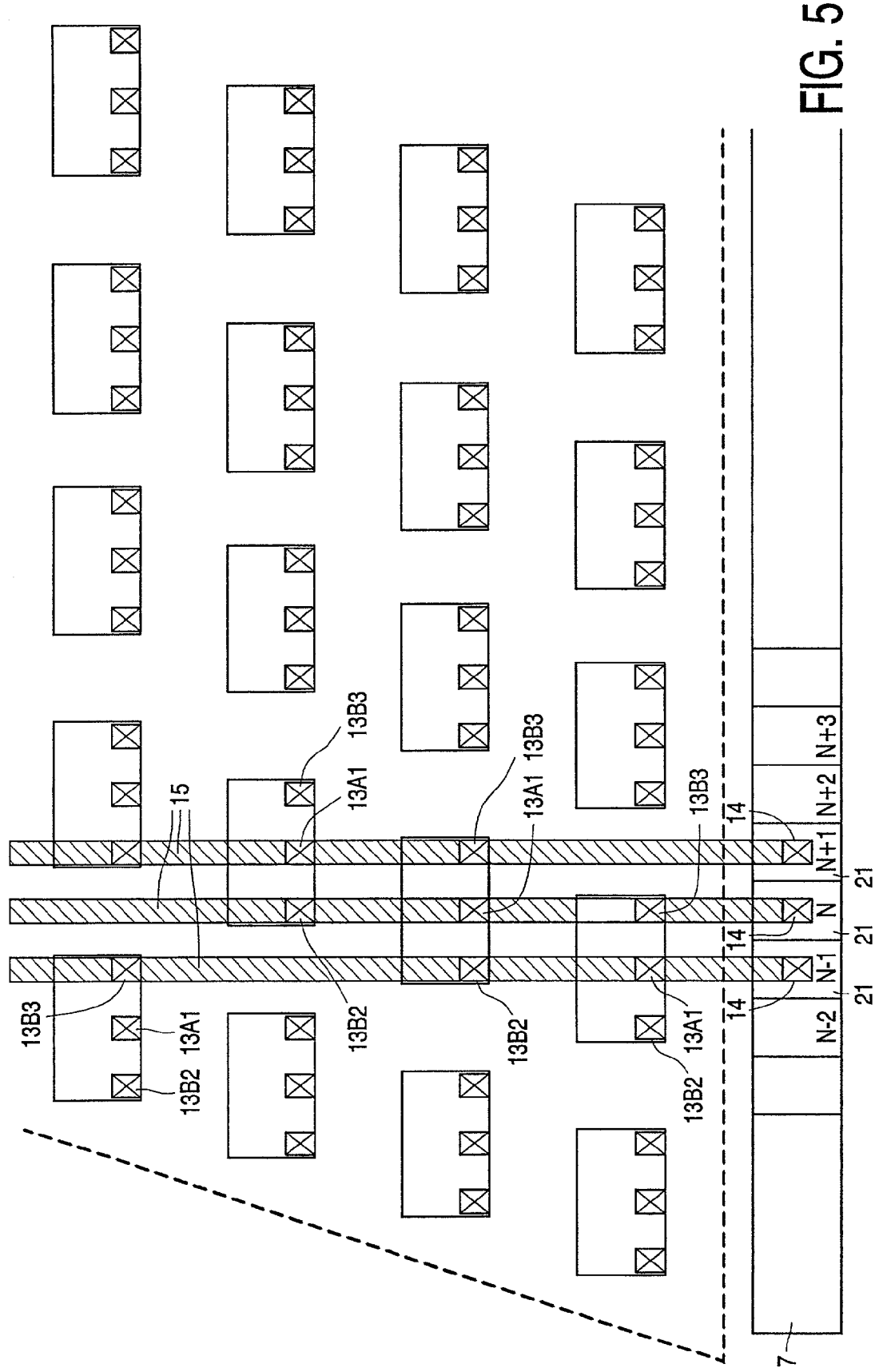

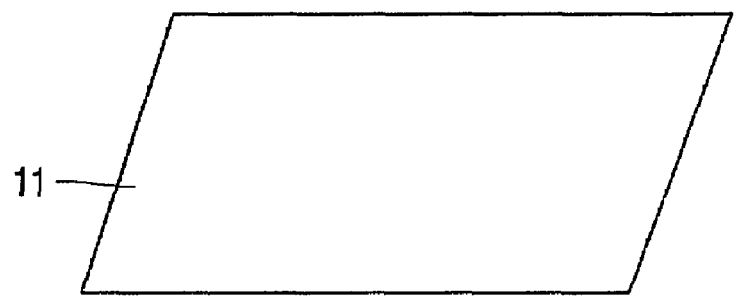
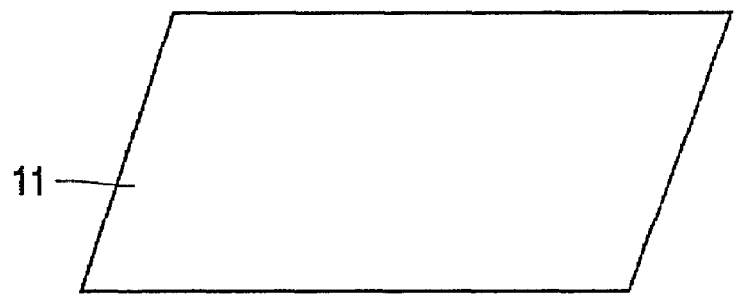
FIG. 6A
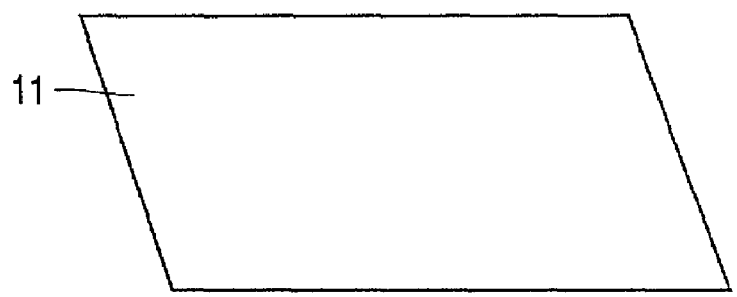
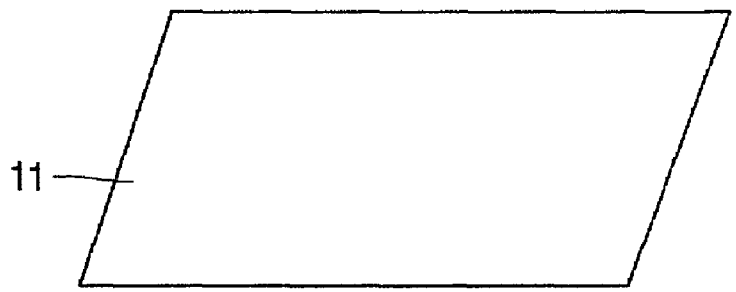
FIG. 6B

DEVICE FOR PARALLEL DATA PROCESSING, AND CAMERA SYSTEM COMPRISING SUCH A DEVICE

The invention relates to a device for parallel data processing.

The invention also relates to a camera system comprising such a device for parallel data processing.

Devices for parallel data processing are generally known. It is also generally known to form such devices as integrated circuits. These are known as digital signal processors (DSPs). A field of application of DSPs is the field of processing and updating image data obtained by means of solid-state image sensors.

In such applications, the DSP is incorporated in a camera system which is provided with optics for creating light images on a solid-state image sensor which converts the light images into analog electric signals, a converter for converting the analog electric signals into image data in a digital form, and said DSP for further processing the data, inter alia, improving the quality of images generated by means of these data on, for example, monitors.

Camera systems as described above are used in, for example, CCTV (closed-circuit television) systems, webcams, video conference systems, DSCs (digital still camera) and professional recording systems as are used in, for example, television studios.

The above-mentioned solid-state image sensors mainly consist of a sensor matrix built up of rows (image lines) and columns of photosensitive elements. In this structure, incident light images are divided into pixels. The incident light images are converted by the photosensitive elements per pixel into an electric signal (pixel signal). All pixel signals combined thus comprise the information of a complete light image. For further processing, the pixel signals are converted into digital data. All data combined thus in turn comprise the information of a complete light image, but now in a digital form.

Usually, solid-state image sensors are realized in a charged-coupled device, CCD, IC technology or a complementary metal-oxide semiconductor, CMOS, IC technology. In both cases, the pixel signals are constituted by electric charge packets. For picking up color information, the separate photosensitive elements in the sensor matrix are provided with, for example, red, green and blue color filters in an alternating pattern.

In a customary reading method, the pixel signals from the photosensitive elements are converted into data row by row (or image line by image line) in the sensor matrix. It is common practice to temporarily store these data in a line memory prior to their further processing. Such a line memory, or data buffer, has space for data originating from at least one image line.

Before the image data is converted into a format which is suitable for display, it is generally necessary to process the image data, for example, for combining color information coming from different pixels. In the device which is required for this purpose, use is made, per pixel, of the associated data and data of surrounding pixels in the sensor matrix. In this case, identical operations are performed a large number of times on data originating from different pixels. Thus, it is obvious to perform these identical operations in parallel with the aid of a device for parallel data processing, for example, a DSP. In fact, it is a generally recognized advantage in this field of application that DSPs for processing the same quantity of data require less time and dissipate less electric power than other data processing devices.

The DSP comprises a plurality of processors and a memory or data buffer for temporary storage of data to be still processed or for temporary storage of data already processed, or for both. The processors of the DSP and the data buffers have data ports for entering and exiting the data.

A considerable problem in the design of the DSP is the positioning of the processors with respect to one another and with respect to the data buffer on an integrated circuit. The mutual positioning has a great influence on the routing of the connections between the data ports of different processors and on the connections between data ports of processors and data ports of data buffers. Due to the parallelism of processing data, many connections are required. Consequently, these connections define to a large extent the surface area which the integrated circuit requires on the silicon.

It is an object of the invention to provide a device for parallel data processing, in which the processors are positioned with respect to one another and to the data buffer in a manner resulting in a minimal surface area.

To this end, the device for parallel data processing is characterized in that the device comprises at least one matrix of processors arranged in rows and columns, the rows being staggered and each processor having at least one data port, at least one of the data ports of one of the processors being connected by means of a substantially straight connection to at least one of the data ports of at least one of the other processors.

A substantially straight connection is understood to mean a connection which is straight and may have small kinks or bends.

The staggering of the processors means that each row of the processors is displaced in the row direction with respect to the previous row of processors. The displacement for each row is effected in the same direction.

By arranging the processors in such a way, substantially straight connections can be established from a data port of one processor to a data port of another processor. A substantially straight connection is the shortest possible connection which also occupies a minimal surface area. This results in an important saving of the required surface area.

The device according to the invention has the further advantage that the connections are not only substantially straight but are also placed as closely as possible to each other so that a further saving of the required surface area is achieved.

Instead of choosing an integrated circuit with a smaller surface area, an alternative choice may be the improvement of the functional operation of the device, for example, by a greater functional operation of larger individual processors. This provides possibilities of implementing more advanced image processing algorithm on one and the same surface area.

The invention is also suitable for use on printed circuit boards, PCBs, in which the processors are arranged as separate integrated circuits on a PCB and the connections are constituted by the metal tracks on the PCB.

An embodiment of the device comprises a data buffer having further data ports, wherein at least one of the data ports of the processors is connected by means of a substantially straight connection to at least one of the further data ports of the data buffer. This embodiment has the advantage that a further saving of the required surface area is achieved by also establishing substantially straight connections between the data ports of the processors and the further data ports of the data buffer.

An embodiment of the device according to the invention is characterized in that the data ports of at least one of the processors comprise at least one primary data port and at least one secondary data port, at least one of the secondary data ports being connected by means of a substantially straight connection to a primary data port of another processor. This embodiment has the advantage that only one connection is required for connecting a plurality of data ports to one another and to at least one of the further data ports of the data buffer, when at least one of the processors is provided with the same data by means of a secondary data port as another processor by means of a primary data port.

An embodiment of the device according to the invention is characterized in that the primary data ports of at least one of the processors comprise at least one primary input data port for receiving data from the data buffer, the secondary data ports comprise at least one secondary input data port for receiving data from the data buffer, and the data ports comprise at least one output data port for sending data to the data buffer. This embodiment has the advantage that both the connections between the primary input data ports of the processors, the secondary data ports of the processors and the further data ports of the data buffer, and the connections between an output data port and a further data port of the data buffer are substantially straight.

An embodiment of the device according to the invention is characterized in that the processors are adapted to process data consisting of a series of data elements, each data processor being adapted to process at least one data element from the series of data elements, and the primary input data port of each processor being connected to the secondary input data port of another processor. This embodiment is very suitable for processing data coming from one image line, in which a processor not only processes the data of one pixel, a data element coming in at the primary input data port, but also data of at least one other pixel, another data element from the same image line, coming in from at least one secondary input data port.

An embodiment of the device according to the invention is characterized in that the secondary input data ports of each processor comprise a first secondary input data port and a second secondary input data port, each primary input data port receiving a data element from the series of data elements for the purpose of processing from a further data port of the data buffer and being connected to the second secondary input data port of the processor which processes the data element preceding the data element in the series of data elements and being also connected to the first secondary input data port of the processor which processes the data element subsequent to the data element in the series of data elements. This embodiment is very suitable for processing data coming from one image line, in which a processor not only requires the data of one pixel coming in at the primary input data port but also data of adjacent pixels in the image line, whose data comes in at the respective secondary input data ports. The connection from the secondary input data port, or of different processors, to a further data port of the data buffer from which data of one pixel is transmitted, is also the same connection as much as possible as that between the primary input data port and the same further data port of the data buffer.

An embodiment of the device according to the invention is characterized in that the data buffer is split up into two physically separated parts, a first part of which is positioned proximate to the first row of processors in the processor matrix, and a second part is positioned proximate to the last row of processors in the processor matrix. This embodiment has the advantage that the surface area required for the connection can be further minimized.

It is also an object of the invention to provide a camera system comprising a sensor matrix built up of rows and columns for converting incident electromagnetic radiation into pixel signals, means for converting pixel signals into data, and a device for parallel data processing.

The camera system according to the invention has the advantage that the whole camera system can be realized as a single integrated circuit due to the relatively small surface area which is required for realizing the device for parallel image data processing. Nevertheless, it may comprise powerful functions for processing recorded image data or for improving the quality of the image data in one integrated circuit. For example, real-time video and implementation of advanced computer vision algorithms are thereby possible. Such functions can thus be realized at lower cost. This in turn provides products for the consumer market with, for example, a video conferencing facility or an autonomous scene interpretation capabilities.

In an embodiment of the camera system according to the invention, the sensor matrix comprises a color filter array and each processor is adapted to process data coming from a plurality of columns of the sensor matrix, which data comprises color information about different colors of the color filter array. Each photosensitive element of the sensor matrix comprises a color filter for, for example, one of the colors red, green or blue. Each photosensitive element will therefore be sensitive to one of said colors. Each processor is adapted to process data coming from a plurality of columns of the sensor matrix, which data comprises color information of different colors of the assembly comprising red, green and blue. This has the advantage that color information is recorded without each pixel separately recording all of the three color components red, green or blue. The device for parallel data processing computes the missing color information per pixel.

These and other aspects of the invention are apparent from and will be elucidated with reference to the embodiments described hereinafter.

IN THE DRAWINGS

FIG. 5 shows diagrammatically a further embodiment of the matrix of processors in a device for parallel data processing according to the invention;

FIG. 6A shows diagrammatically a further embodiment of a part of the camera system according to the invention; and FIG. 6B shows diagrammatically a further embodiment of a part of the camera system according to the invention.

In these Figures, identical components are denoted by the same reference signs.

Figure 1:
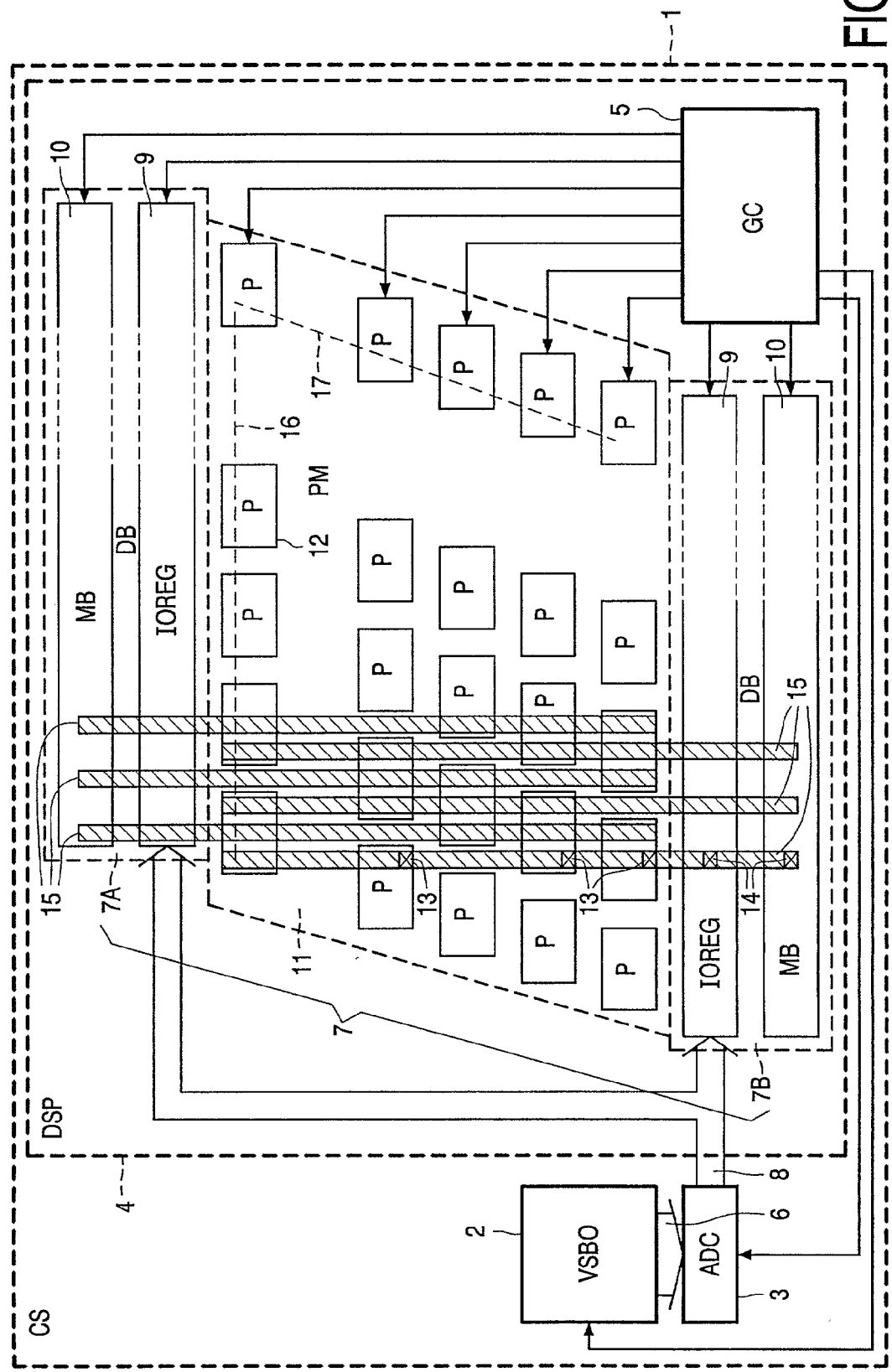
FIG. 1 shows diagrammatically an embodiment of a camera system according to the invention.

The camera system 1 of FIG. 1 comprises a sensor matrix 2, means for converting pixel signals into data, the data converter 3, a device for parallel data processing, a DSP 4, and a central controller 5 for co-ordinating tasks of the different components. The entire camera system 1 is preferably realized in a CMOS technology, in which all components are realized in one integrated circuit. In an alternative embodiment, the different components are realized on at least two separate integrated circuits. This has the advantage that the sensor matrix 2 can be realized both in CMOS and in CCD technology.

The sensor matrix 2 is built up of rows, the image lines, and columns of photosensitive elements. Due to this structure, incident light images are split up into pixels. The incident light images are converted per pixel by the photosensitive elements into a pixel signal. The data converter 3 comprises at least one A/D converter. It is recommended to convert pixel signals from one and the same image line simultaneously to data. Although a plurality of A/D converters is necessary for this purpose, the requirements are less stringent, notably as regards the conversion rate. An arrow 6 indicates the path covered by the pixel signals from the sensor matrix 2 to the data converter 3.

The data is sent from the data converter 3 to the DSP 4, An arrow 8 indicates the path covered by the data from the data converter 3 to the DSP 4 and further within the DSP 4. In said embodiment, the DSP 4 comprises a data buffer 7 which is further functionally subdivided into an input/output register, I/O register 9, and a memory bank 10. The DSP also comprises a matrix of processors, processor matrix 11, which further comprises individual processors 12. Finally, the central controller 5 is incorporated in the DSP 4 in the embodiment shown.

Within the DSP 4, the data coming from the data converter 3 is transported to the data buffer 7. This data transport is indicated by means of the arrow 8. In the embodiment shown, the data buffer 7 is constituted by two physically separated parts, denoted by 7A and 7B, respectively, in the FIG. 1. This provides advantages which will be further explained below. Moreover, in the embodiment shown, each part 7A and 7B of the data buffer 7 is divided into two functionally different pans, the I/O register 9 and the memory bank 10. The I/O register 9 is used for storing data which are still to be processed and data already processed. The memory bank 10 is used for storing intermediate results.

The processors 12 in the processor matrix 11 have data ports 13. The data buffer 7 has further data ports 14. The data ports 13 are understood to be the inputs at which the processors 12 receive the incoming data, for example, from the data buffer 7, and the outputs from which the processors 12 send the outgoing data. The further data ports 14 are understood to be the inputs at which the data buffer 7 receives the incoming data, for example, from the processors 12, and the outputs from which the data buffer 7 sends the outgoing data, for example, to the processors 12.

Integrated circuits are designed at different levels. A possible division comprises the functional level and the layout level. At the functional level, the different parts of an integrated circuit are divided into functional blocks, inter alia, the processors 12 and the data buffer 7 and their mutual relations in the case of this DSP. At the layout level, the different functional blocks, implemented in library cells, are subsequently positioned and interconnected by means of connections.

A connection 15 comprises at least one essentially rectangular strip of electrically conducting material which is arranged in a manner customary in the IC technology during the manufacture of an integrated circuit and ensures that at least two parts of an integrated circuit are connected together in an electrically conducting manner. A data port 13 or a further data port 14 is the location where a part of an integrated circuit, for example, a data buffer 7 or a processor 12, establishes electrically conducting contact with a connection.

The connection 15 is also understood to be an assembly of a plurality of connections as described above, which are mutually contacted in an electrically conducting manner by means of a method which is customarily used in the IC technology.

In the embodiment shown, the connections are intended to send, in parallel, data comprising a plurality of bits, and each connection 15 consequently comprises a plurality of juxtaposed strips as described above, which each time establish electrically conducting contact with the same data ports.

Integrated circuits which are identical at a functional level may have mutually large differences at the layout level because library cells are positioned with respect to each other in a substantially different manner. This also results in connections 15 laid in an essentially different manner.

A considerable problem in the design of the DSP 4 at the layout level is the positioning of the processors 12 with respect to one another and to the data buffer 7. The mutual positioning has great influence on the routing of the connections 15 between the data ports 13 of different processors 12 and of the connections 15 between the data ports 13 and the further data ports 14 of the data buffer 7. Due to the parallelism in processing data, many connections 15 are required. Consequently, they define to a great extent the surface area which the integrated circuit requires on the silicon.

According to the invention, the processors 12 are positioned with respect to one another and to the data buffer 7 in a way resulting in a minimal surface area. The embodiment shown in FIG. 1 shows how this is achieved in the layout of the DSP.

First of all, the processors 12 in the processor matrix 11 are arranged in rows 16 and columns 17, the rows 16 being staggered and each processor 12 having at least one data port 13. The data buffer 7 is also provided with the further data ports 14. Moreover, the data ports 13 of the processors 12 are connected by means of substantially straight connections 15 to at least one of the further data ports 14 of the data buffer 7.

The staggered configuration of the processors 12 in each row 16 of the processors is displaced in the row direction with respect to the previous row of processors. The displacement is realized in the same direction for each row 16.

By arranging the processors 12 in such a way, it is achieved that substantially straight connections can be established from the data port 13 of the one processor to the data port of the other processor, or from the data port to the further data port 14. The substantially straight connection 15 is the shortest possible connection which also occupies a minimal surface area. A considerable saving of surface area is then achieved.

A further advantage is that the connections 15 as shown in the FIG. 1 may not only be positioned in a substantially straight manner but also as closely as possible to each other, so that a further saving of the required surface area is achieved.

A further possibility of putting the connections 15 as closely as possible together and hence saving surface area is to split up the data buffer 7 into two physically separated parts in the form of a first part of the data buffer 7A, positioned proximate to the first row of data processors 12 in the processor matrix 11, and a second part of the data buffer 7B positioned proximate to the last row of data processors in the processor matrix 11.

To optimally benefit from the split-up of the data buffer 7 as described above, a connection 15 is each time connected to a further data port 14 of the first part of the data buffer 7A and an adjacent connection 15 is connected to a further data port 14 of the second part of the data buffer 7B.

Instead of choosing an integrated circuit having a smaller surface area, an alternative choice is to improve the functional operation of the device, for example, more functional operations of larger individual processors 12, or to enlarge the data buffer 7. This provides possibilities of implementing more advanced image processing algorithms on the same surface area.

It will be evident that the design of the DSP 4 described above is not only suitable for use in integrated circuits but is also suitable for use on PCBs in which the processors 12 are arranged as separate integrated circuits on a PCB and the connections 15 are constituted by the electrically conducting tracks on the PCB.

The camera system 1 with the DSP 4 described above is a camera system which can be realized by means of a single integrated circuit. This is made possible by the relatively small surface area which is required for the DSP 4. Nevertheless, the camera system 1 has powerful functions for processing recorded image data or for improving the quality of the image data in one integrated circuit. For example, real-time video and implementation of advanced computer vision algorithms will thereby become possible. Such functions can be realized at lower cost with the camera system according to the invention. This in turn provides products for the consumer market with, for example, video conferencing facilities or autonomous scene interpretation capabilities.

Figure 2:
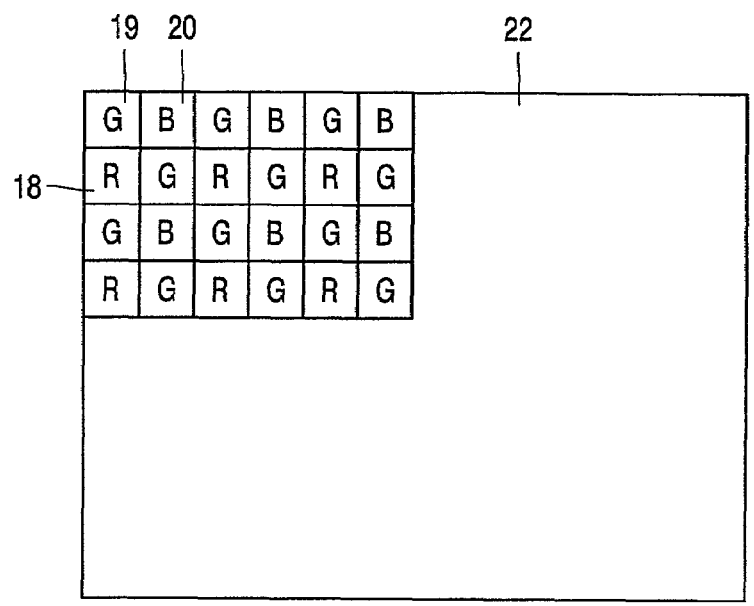
FIG. 2 shows diagrammatically a color filter array as used in an embodiment of a camera system according to the invention.

FIG. 2 shows diagrammatically a color filter array 22. When it is put on the sensor matrix 2, each photosensitive element receives light of a specific color and thus becomes sensitive to this specific color. The pattern shown ensures that each photosensitive element from the sensor matrix becomes sensitive to one of the colors red 18, green 19 or blue 20. A row in the sensor matrix thus comprises information of two of these colors. The sensor matrix is each time read row by row. The DSP 4 processes one color per processing operation. It is therefore advantageous to each time process, per processor 12, data coming from two juxtaposed columns in the sensor matrix, for these columns each time comprise information about two different colors. A number of 320 processors 12 is then required for line-sequentially processing, for example, a VGA image comprising 480 rows of 640 pixels each.

It will be evident that the way in which a plurality of columns of the sensor matrix 2 jointly share one processor 12 is dependent on the color filter array 22 used. For example, in the case where the color filter array 22 ensures that three colors occur in each sensor matrix row, it is sufficient to use one processor 12 for every three columns of the sensor matrix.

Due to the row-sequential processing of the pixel signals, it is advantageous to simultaneously convert the pixel signals from one row into data in the data converter 3. Although a plurality of A/D converters is necessary for this purpose, the requirements are less stringent, notably as regards the conversion rate. As a result of the lower conversion rate per A/D converter, the conversion of pixel signals into data requires considerably less electrical power.

Since the DSP 4 each time processes one color per processing operation and each row of the sensor matrix 2 comprises two colors, it is sufficient to use one A/D converter per two columns of the sensor matrix in the data converter 3. This is achieved by making use of time multiplexing of pixel signals coming from both columns.

Figure 3:
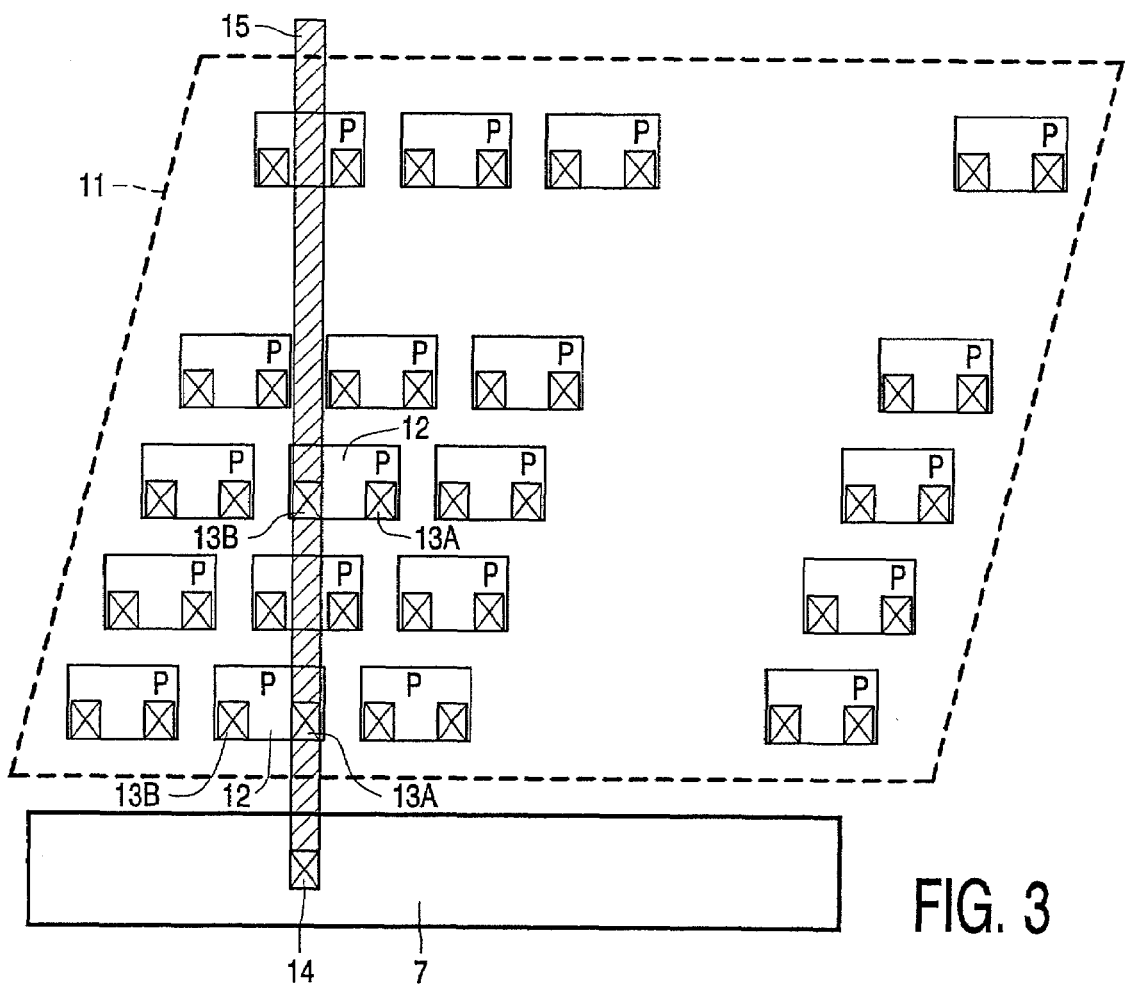
FIG. 3 shows diagrammatically an embodiment of the matrix of processors in a device for parallel data processing according to the invention.

FIG. 3 shows diagrammatically an embodiment of the processor matrix 11. In this embodiment, the processors 12 have a plurality of data ports 13. Primary data ports 13A and secondary data ports 13B can be distinguished within the data ports. The primary data port 13A of one processor 12 and the secondary data port 13B of the other processor are interconnected by means of the substantially straight connection 15. This is achieved by means of the mode of positioning the processors 12 in the processor matrix 11, as already described with reference to FIG. 1. This embodiment has the advantage that only one connection 15 is required for interconnecting the data ports 13A and 13B and for connecting them to one of the further data ports 14 of the data buffer 7 when the same data must be sent to both the primary input 13A of the one processor 12 and to the secondary input 13B of the other processor. It is advantageous when the part of the connection 15 between the primary data port 13A and the further data port 14 of the data buffer 7 is also substantially straight.

Figure 4:
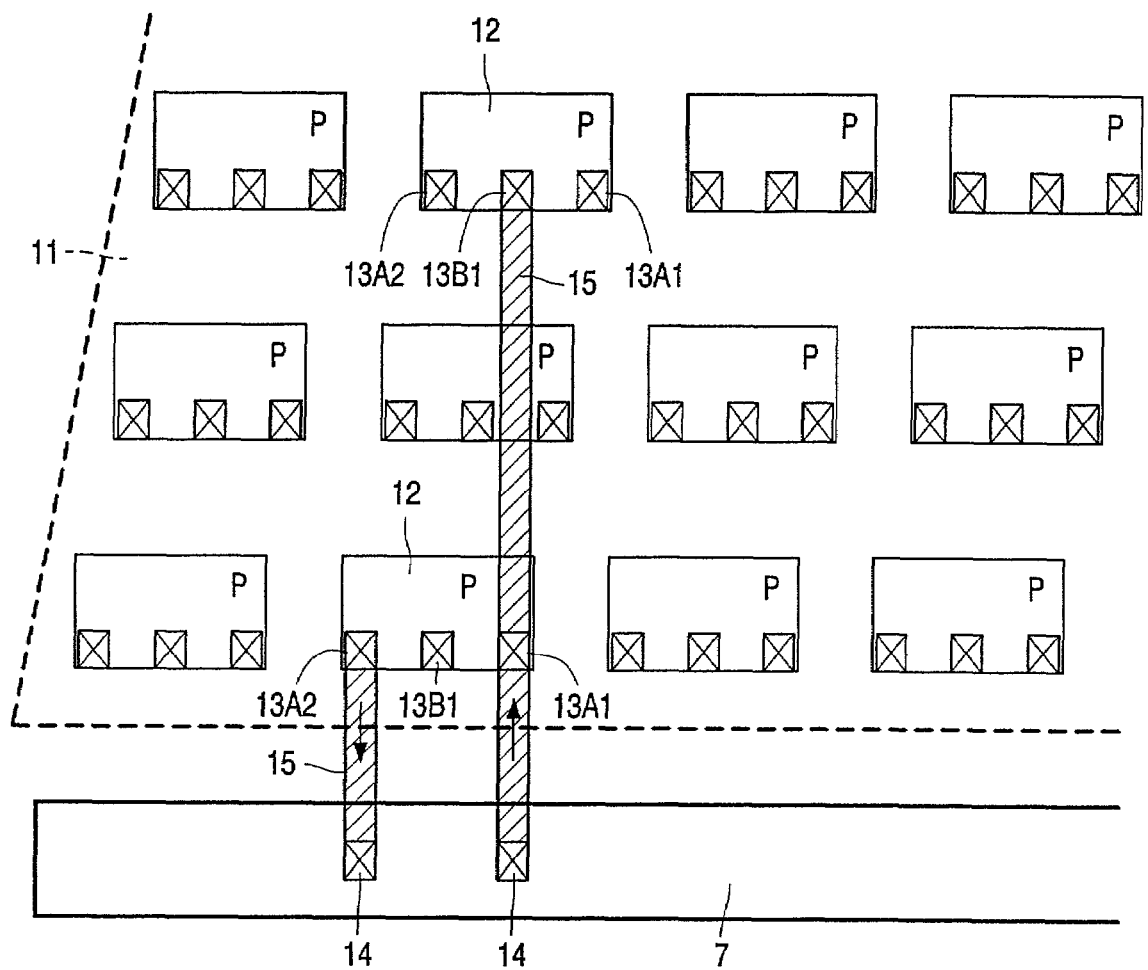
FIG. 4 shows diagrammatically a further embodiment of a matrix of processors in a device for parallel data processing according to the invention.

FIG. 4 shows diagrammatically an embodiment of the processor matrix 11 in which the processors 12 have a plurality of data ports 13. These are subdivided into a primary input data port 13A for receiving data from the data buffer, a secondary input data port 13B1, also for receiving data from the data buffer, and an output data port 13A2. The primary input data port 13A1 of the one processor 12 is connected by means of the substantially straight connection 15 to both the secondary input data port 13B1 of the other processor and to the further data port 14 of the data buffer 7. The arrow in the connection 15 indicates the direction of the data transport. Furthermore, the output data port 13A2 is connected by means of the connection 15 to the further data port 14 of the data buffer. This embodiment has the advantage that both the connections 15 between the primary input data ports 13A1 of the processors, the secondary input data ports 13B1 of the processors 12 and the further data ports 14 of the data buffer 7, and the connections 15 between the output data ports 13A2 and the further data ports 14 of the data buffer 7 are substantially straight.

When processing data coming from one image line, it is often necessary that each processor 12 not only processes the data of one pixel coming in at the primary input data port 13A1 but also data of another pixel. The latter data then comes in via the secondary input data port 13B1. This is achieved when the connection 15 connects the secondary input data port 13B1 and the primary input data port 13A1 to the further data port 14 of the data buffer. The embodiment of FIG. 4 is particularly suitable for this purpose because all connections 15 are substantially straight due to the positioning of the processors 12 in the processor matrix 11.

FIG. 5 shows diagrammatically an embodiment of the processor matrix 11 which is very suitable for processing data consisting of series of data elements. Each processor 12 processes one data element 21 from the series of data elements stored in the data buffer 7. The processors 12 have a plurality of data ports 13 which are subdivided into a primary input data port 13A1 for receiving data from the data buffer, a first secondary input data port 13B2 and a second secondary input data port 13B3. Each primary input data port 13A1 receives a data element 21, for example N, from a further data port 14 of the data buffer 7. The same processor also receives the data element 21, for example N−1, preceding in the row at the first secondary input data port 13B2, and the data element 21, for example N+1, subsequent in the row at the second secondary input data port 13B3. This is realized by connecting the primary input data port 13A1 of a first processor 12 by means of the substantially straight connection 15 to both the first secondary input data port 13B2 of the second processors and the second secondary input data port 13B3 of the third processor, and to the further data port 14 of the data buffer 7.

FIG. 6A shows diagrammatically a further embodiment of a part of the camera system according to the invention. In this embodiment, the DSP 4 does not comprise one processor matrix 11 but two processor matrices 11 which are juxtaposed. It is of course also possible to juxtapose more than two processor matrices. This embodiment has the advantage that the processors 12 in both processor matrices 11 can perform different processing operations on the same data. Two of these processors 12, both of which are situated in a different processor matrix 11 but at corresponding positions in the processor matrix, then receive the same data at their data ports 13. Another advantage is that the results of processing operations of the processors 12 in one processor matrix 11 can be exchanged with those of the processors 12 in another one of the processor matrices 11.

FIG. 6B shows diagrammatically a further embodiment of a part of the camera system according to the invention. In this embodiment, the DSP 4 does not comprise one processor matrix 11 but two processor matrices 11 which are juxtaposed. Moreover, both processor matrices are mirrored with respect to each other. This may of course also be performed in a repetitive manner. For performing some processing operations, it may be advantageous to juxtapose processor matrices in a mutually mirrored configuration.

In summary, the invention relates to a device for parallel processing data and to a camera system comprising such a device. The camera system 1 comprises a sensor matrix 2, a data converter 3, a DSP 4, a central controller 5, a data buffer 7 and a processor matrix 11 consisting of processors 12. The sensor matrix 2 converts incident electromagnetic radiation into pixel signals. The data converter 3 converts the pixel signals into data. The arrows 6 and 8 diagrammatically indicate the transport of pixel signals and data. The data buffer 7 is physically divided into a part 7A and a part 7B and functionally divided into an I/O register 9 and a memory bank 10. The central controller 5 co-ordinates the different tasks. The processors 12 and the data buffer 7 have data ports 13 and further data ports 14 with inputs and outputs which are mutually connected in an electrically conducting manner by means of the connections 15. The processors 12 are arranged in rows 16 which are mutually staggered, and columns 17. This makes all connections 15 substantially straight. Due to the amount of connections, this reduces the surface area.

In the embodiments described, notably embodiments of a camera system have been discussed. It will be evident to those skilled in the art that the device for parallel data processing according to the invention is suitable for use in many fields.

The invention claimed is:

1. A device for parallel data processing, comprising at least one matrix of processors arranged in rows and columns, the rows being staggered and each processor having at least one data port, with at least one of the data ports of one of the processors in a row being connected by means of a substantially straight connection to at least one of the data ports of at least one of the other processors in another row; and least one data buffer having one or more data ports, with at least one of the data ports of at least one processor being connected by means of a substantially straight connection, wherein the data port of a processor in a row is not connected to the data port of another processor in the same row, and wherein the data ports of at least one of the processor include at least one primary data port and at least one secondary data port, with at least one of the secondary data ports being connected by means of a substantially straight connection to a primary data port of another processor.

2. A device as claimed in claim 1, wherein the data buffer is split up into two physically separated parts, a first part of which is positioned proximate to the first row of processors in the processor matrix, and a second part is positioned proximate to the last row of processors in the processor matrix.

3. The device of claim 1, wherein the device is part of a camera system having a sensor matrix built up of rows and columns for converting incident electromagnetic radiation into pixel signals, and means for converting pixel signals into data.

4. The device of claim 3, wherein the sensor matrix has a color filter array and each processor is adapted to process data coming from a plurality of columns of the sensor matrix, which data includes color information about different colors of the color filter array.

* * * * *